US012785013B2

(12) United States Patent
Yao et al.

(10) Patent No.: US 12,785,013 B2
(45) Date of Patent: Nov. 3, 2026

(54) OPERATING MECHANISM AND SWITCHING DEVICE

(71) Applicant: Chint Low Voltage Electrical Technology Co., Ltd., Shanghai (CN)

(72) Inventors: Wei Yao, Shanghai (CN); Denggui Ao, Shanghai (CN); Yongfu Xu, Shanghai (CN); Gaoqiang Shen, Shanghai (CN); Chuncui Wang, Shanghai (CN); Dajun Cao, Shanghai (CN)

(73) Assignee: Chint Low Voltage Electrical Technology Co., Ltd. (CN)

( * ) Notice: Subject to any disclaimer, the term of this patent is extended or adjusted under 35 U.S.C. 154(b) by 285 days.

(21) Appl. No.: 18/556,868

(22) PCT Filed: Aug. 10, 2022

(86) PCT No.: PCT/CN2022/111394
§ 371 (c)(1),
(2) Date: Oct. 23, 2023

(87) PCT Pub. No.: WO2023/029911
PCT Pub. Date: Mar. 9, 2023

(65) Prior Publication Data
US 2024/0212955 A1 Jun. 27, 2024

(30) Foreign Application Priority Data
Aug. 31, 2021 (CN) ......................... 202111016954.8

(51) Int. Cl.
*H01H 33/28* (2006.01)
*H01H 33/42* (2006.01)

(52) U.S. Cl.
CPC ............ *H01H 33/28* (2013.01); *H01H 33/42* (2013.01)

(58) Field of Classification Search
CPC .......... H01H 3/40; H01H 3/38; H01H 3/3031; H01H 3/42; H01H 3/52; H01H 3/3005;
(Continued)

(56) References Cited

U.S. PATENT DOCUMENTS 7,679,018 B2 * 3/2010 Kolmonen ............... H01H 3/42 200/500
9,478,373 B2 * 10/2016 Välivainio .............. H01H 1/365
(Continued)

FOREIGN PATENT DOCUMENTS

CA 2728221 A1 12/2009
CN 102468077 A 5/2012
(Continued)

OTHER PUBLICATIONS

Translation of CN209104016(original document published Jul. 12, 2019) (Year: 2019).*
(Continued)

*Primary Examiner* — William A Bolton
(74) *Attorney, Agent, or Firm* — OSTROLENK FABER LLP

(57) ABSTRACT

An operating mechanism having a second operating shaft assembly that rotates around its axis to drive a second transmission structure. One end of a second energy storage spring structure drives an energy storage shaft while the other end of the second energy storage spring structure is arranged rotatably. The second transmission structure is in driving fit with the energy storage shaft to drive the energy storage shaft to rotate, so that the second energy storage spring structure stores energy. The second energy storage spring structure releases energy after turning past a second dead center position to drive the energy storage shaft to rotate. The energy storage shaft includes an energy storage shaft gear, a power output structure includes a power output
(Continued)

gear shaft, and the energy storage shaft gear is engaged with the power output gear shaft to drive the power output gear shaft to rotate.

14 Claims, 5 Drawing Sheets

(58) Field of Classification Search
CPC .......... H01H 9/26; H01H 33/28; H01H 33/42; H01H 71/1009; H01H 71/56; H01H 19/24; H01H 19/64; H01H 31/026
USPC .......................... 218/1, 5, 7, 12, 14; 200/400
See application file for complete search history.

(56) References Cited

U.S. PATENT DOCUMENTS

| | | | | | |
|---|---|---|---|---|---|
| 10,622,178 | B2 * | 4/2020 | Zheng | H01H 71/1054 | |
| 10,629,390 | B2 * | 4/2020 | Kuhn | H01H 19/64 | |
| 10,665,401 | B2 * | 5/2020 | Wu | H01H 19/24 | |
| 10,950,395 | B2 * | 3/2021 | Strand | H01H 19/24 | |
| 11,756,755 | B2 | 9/2023 | Huang et al. | | |
| 2011/0073453 | A1 | 3/2011 | Bottcher et al. | | |
| 2015/0068881 | A1 * | 3/2015 | Watford | H01H 71/1027 | 29/622 |

FOREIGN PATENT DOCUMENTS

| | | | | | |
|---|---|---|---|---|---|
| CN | 204537959 | U | | 8/2015 | |
| CN | 204720401 | U | | 10/2015 | |
| CN | 207116254 | U | | 3/2018 | |
| CN | 209104016 | | * | 7/2019 | H01H 9/26 |
| CN | 110189955 | A | | 8/2019 | |
| CN | 111681923 | A | | 9/2020 | |
| CN | 216624086 | U | | 5/2022 | |

OTHER PUBLICATIONS

International Search Report mailed Oct. 25, 2022 in corresponding PCT International Application No. PCT/CN2022/111394.
EESR dated Feb. 7, 2025, issued in corresponding European Patent Application No. 22863052.1.

* cited by examiner

OPERATING MECHANISM AND SWITCHING DEVICE

CROSS-REFERENCE TO RELATED APPLICATIONS

The present application is a 35 U.S.C. §§ 371 national stage application of International Application No. PCT/CN2022/111394, filed Aug. 10, 2022, which claims priority to Chinese Patent Application No. 202111016954.8, filed Aug. 31, 2021, the contents of which are incorporated herein by reference.

TECHNICAL FIELD

The present invention relates to the field of low-voltage electrical appliances, and more particularly to an operating mechanism and a switching device including the operating mechanism.

BACKGROUND ART

A switching device (e.g., an isolating switch) is an electrical product for a circuit to be closed or opened, and generally include at least one conductive device, and an operating mechanism which is in driving connection to the conductive device to drive the conductive device to be switched on or off. The conductive device is switched on or off in response to the contact or separation of a moving contact mechanism and a static contact inside the conductive device. A speed at which the moving contact is disconnected from the static contact and a final gap therebetween determine the electrical properties of the switching device. The existing switch devices are often limited by their appearance dimensions, resulting in the inability to achieve a larger disconnecting gap and faster opening and closing speeds, which in turn affect the product performances.

SUMMARY OF THE INVENTION

An object of the present invention is to overcome the defects of the prior art, and provide an operating mechanism, which can flexibly adjust a breaking speed and an opening distance of a conductive device connected to the operating mechanism. The present invention further provides a switching device, which can adjust the breaking speed and the opening distance of the conductive device according to needs without changing the volume.

In order to achieve the above object, the present invention adopts the following technical solutions:

An operating mechanism, comprising an operating mechanism housing, and a second operating shaft assembly, a second transmission structure, an energy storage structure and a power output structure which are respectively disposed in the operating mechanism housing, wherein the second operating shaft assembly is in driving fit with the second transmission structure; the second operating shaft assembly rotates around its axis to drive the second transmission structure to reciprocate; the energy storage structure comprises an energy storage shaft and a second energy storage spring structure; one end of the second energy storage spring structure is in driving connection to the energy storage shaft while the other end of the second energy storage spring structure is arranged rotatably; the second transmission structure is in driving fit with the energy storage shaft to drive the energy storage shaft to rotate, so that the second energy storage spring structure stores energy;

the second energy storage spring structure releases energy after turning past a second dead center position to drive the energy storage shaft to rotate; the energy storage shaft comprises an energy storage shaft gear; the power output structure comprises a power output gear shaft; and the energy storage shaft gear is engaged with the power output gear shaft to drive the power output gear shaft to rotate.

Preferably, a gear radius of the energy storage shaft gear is greater than a gear radius of the power output gear shaft.

Preferably, the second transmission structure comprises a second transmission rack; the second operating shaft assembly comprises a second operating shaft, and a second drive gear which is disposed on the second operating shaft and rotates synchronously with the second operating shaft; and the second drive gear is engaged with the second transmission rack.

Preferably, the second transmission structure further comprises a second transmission structure driving portion; the second transmission structure driving portion is a second driving finger which extends and protrudes to the energy storage shaft; the energy storage shaft further comprises a second driven structure, the second driven structure comprising two energy storage shaft force-loading sides spaced from each other; and the second transmission structure driving portion is located between the two energy storage shaft force-loading sides, and cooperates with the two energy storage shaft force-loading sides respectively to drive the energy storage shaft to rotate in two opposite directions.

Preferably, the energy storage shaft further comprises an energy storage shaft connecting column disposed on an axial end of the energy storage shaft; the second energy storage spring structure comprises a second energy storage spring, a spring supporting rod, a spring supporting seat and a limiting shaft; the spring supporting seat is fixedly disposed on the operating mechanism housing; one end of the spring supporting rod is rotatably connected to the energy storage shaft connecting column, while the other end of the spring supporting rod passes through the spring supporting seat and is then connected to the limiting shaft; the limiting shaft is in limiting fit with the spring supporting seat to prevent the spring supporting rod from detaching from the spring supporting seat; the second energy storage spring is disposed to sleeve the spring supporting rod, and two ends of the second energy storage spring are in elastic contact with the spring supporting rod and the spring supporting seat, respectively; the energy storage shaft rotates and drives the spring supporting rod to move relative to the spring supporting seat through the energy storage shaft connecting column, so that the second energy storage spring is compressed for energy storage.

Preferably, the energy storage shaft comprises two energy storage shaft connecting columns which are spaced form each other in parallel, and two sets of second energy storage spring structures are respectively disposed on two radial sides of the energy storage shaft and cooperate with the two energy storage shaft connecting columns, respectively.

Preferably, the operating mechanism comprises two symmetrical energy storage shafts, and the spring supporting rods of the second energy storage spring structures are located between the two energy storage shafts and rotatably connected to the corresponding the two energy storage shaft connecting columns of the two energy storage shafts.

Preferably, the energy storage shaft further comprises an energy storage shaft body; the energy storage shaft gear is a sector gear and is located at one radial end of the energy storage shaft body; two energy storage shaft force-loading sides are located at the other radial end of the energy storage shaft body; and two energy storage shaft connecting columns are spaced on an axial end of the energy storage shaft body in parallel.

Preferably, the operating mechanism comprises two symmetrical energy storage shafts, and two symmetrical power output gear shafts; and the energy storage shaft gears of the two energy storage shafts are engaged with the two power output gear shafts, respectively.

Preferably, the power output structure further comprises an output structure bracket which is disposed in the operating mechanism housing and fixedly connected to the operating mechanism housing; and two power output gear shafts are rotatably disposed on both sides of the output structure bracket respectively, and each power output gear shaft is located between the output structure bracket and the operating mechanism housing.

Preferably, the output structure bracket comprises an operating shaft mounting hole formed in the middle, and a second operating shaft of the second operating shaft assembly is rotatably inserted in the operating shaft mounting hole.

Preferably, the output structural bracket comprises two single-sided structure brackets that are opposed to cooperate with each other; and the two single-sided structural brackets are fixedly connected to a pair of opposite sidewalls of the operating mechanism housing, respectively.

Preferably, the operating mechanism further comprises an auxiliary switch and an auxiliary switch driving structure which are disposed in the operating mechanism housing, respectively; the second operating shaft assembly further comprises an auxiliary drive gear which is disposed on the second operating shaft of the second operating shaft assembly and rotates synchronously therewith; the auxiliary switch driving structure comprises an auxiliary driven rack, and the auxiliary drive gear is engaged with the auxiliary driven rack; and the second operating shaft rotates to drive the auxiliary switch driving structure to move through the cooperation of the auxiliary drive gear and the auxiliary driven rack, so as to trigger the auxiliary switch.

Preferably, the operating mechanism comprises two auxiliary switches, i.e., a first auxiliary switch and a second auxiliary switch which are disposed on both sides of the first operating shaft respectively; the auxiliary switch driving structure further comprises a driving structure body, a first trigger arm and a second trigger arm; the first trigger arm and the second trigger arm are connected to both ends of the driving structure body and are in driving fit with the first auxiliary switch and the second auxiliary switch, respectively; and the auxiliary driven rack is disposed on the driving structure body.

Preferably, the driving structure body is of a square frame structure, and a driving structure avoidance hole for the second operating shaft to pass through is formed in the middle of the driving structure body; the auxiliary driven rack is disposed on one inner side wall of the driving structure avoidance hole; and the auxiliary drive gear is located in the driving structure avoidance hole.

Preferably, a second operating shaft of the second operating shaft assembly is disposed along a length direction of the operating mechanism; one end of the second operating shaft protrudes out of one end of the operating mechanism in the length direction for external operation; the second transmission structure is slidably disposed at the other end of the operating mechanism in the length direction; the first auxiliary switch and the second auxiliary switch are spaced side by side along a width direction of the operating mechanism; the auxiliary switch driving structure, the power output structure and the second energy storage spring structure are arranged sequentially along the length direction of the operating mechanism and are located between the auxiliary switch and the second transmission structure; the two power output gear shafts are spaced side by side on both sides of the second operating shaft along a thickness direction of the operating mechanism; the two energy storage shafts are spaced side by side on both sides of the second operating shaft along the thickness direction of the operating mechanism; an output structure bracket of the power output structure is disposed between two power output gear shafts; the two power output gear shafts are rotatably disposed on the output structure bracket, respectively; and the second operating shaft passes through the middle of the output structure bracket.

A switching device, comprising the operating mechanism.

Preferably, the switching device further comprises a conductive device which is in driving connection to the operating mechanism; the conductive device comprises a conductive device housing, and a contact system and an arc extinguishing system which are disposed in the conductive device housing and used in cooperation therewith; the contact system comprises a moving contact mechanism pivotally disposed on the conductive device housing, and a static contact cooperating with the moving contact mechanism; the operating mechanism is in driving connection to the moving contact mechanism and thus drives the moving contact mechanism to rotate, so that the moving contact mechanism and the static contact are closed or opened.

Preferably, the moving contact mechanism comprises a contact support which is disposed pivotally, and a moving contact assembly inserted in the contact support, wherein both ends of the contact support protrude out of two radial ends of the contact support; two static contacts are disposed on both sides of the moving contact mechanism to cooperate with both ends of the moving contact assembly; and the arc extinguishing system comprises two arc extinguishing chambers which are disposed on both sides of the contact system respectively.

According to the operating mechanism of the present invention, the energy storage shaft gear cooperates with the power output gear shaft. By adjusting a gear-radius ratio of the energy storage shaft gear and the power output gear shaft, the breaking speed and opening distance of the conductive device connected to the operating mechanism can be flexibly adjusted without increasing the volume of the operating mechanism. In addition, the radius of the energy storage shaft gear 1-301*b* is greater than the gear radius of the power output gear shaft 1-41*b*, which is conducive to increasing the breaking speed and opening distance of the conductive device connected to the operating mechanism.

The switching device of the present invention includes the operating mechanism. The switching device can adjust the breaking speed and the opening distance of the conductive device according to needs without changing the volume.

DETAILED DESCRIPTIONS OF THE PREFERRED EMBODIMENTS

The specific implementation of a switch device of the present invention will be further described below in conjunction with the embodiments given in FIGS. 1 to 9. The switch device of the present invention is not limited to the description of the following embodiments.

Figure 9:
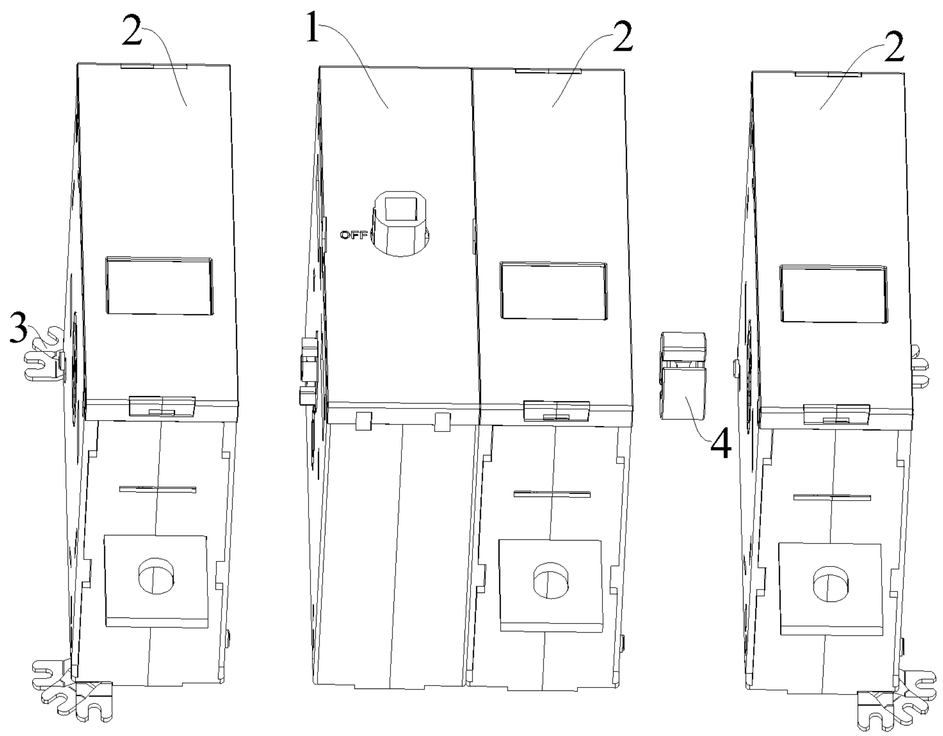
FIG. 9 is a schematic structural diagram of a switching device of the present invention.

As shown in FIG. 9, the switch device of the present invention, preferably an isolating switch, includes an operating mechanism 1 and a conductive device 2, wherein the operating mechanism 1 is driving connection to the conductive device 2 to drive the conductive device 2 to be switched on or off. Further, the conductive device 2 includes a conductive device housing, and a contact system and an arc extinguishing system which are disposed in the conductive device housing and used in cooperation therewith; the contact system includes a moving contact mechanism pivotally disposed on the conductive device housing, and a static contact cooperating with the moving contact mechanism; the operating mechanism is in driving connection to the moving contact mechanism and thus drives the moving contact mechanism to rotate, so that the moving contact mechanism and the static contact are closed or opened. Further, the moving contact mechanism includes a contact support which is disposed pivotally, and a moving contact assembly inserted in the contact support, wherein both ends of the contact support protrude out of two radial ends of the contact support; two static contacts are disposed on both sides of the moving contact mechanism to cooperate with both ends of the moving contact assembly respectively; and the arc extinguishing system includes two arc extinguishing chambers which are disposed on both sides of the contact system respectively.

As shown in FIG. 9, in the switching device of the present invention, a conductive device 2 which is in driving connection to the operating mechanism 1 is respectively disposed on both sides of the operating mechanism 1.

As another embodiment of the switching device of the present invention, a conductive device 2 which is in driving connection to the operating mechanism 1 is disposed only on one side of the operating mechanism 1.

An embodiment of the operating mechanism 1 is shown in FIGS. 1 to 8.

The operating mechanism 1 includes an operating mechanism housing 1-0, and a second operating shaft assembly 1-1*b*, a second transmission structure 1-2*b*, an energy storage structure 1-3*b* and a power output structure 1-4*b* which are respectively disposed in the operating mechanism housing 1-0), wherein the second operating shaft assembly 1-1*b* is in driving fit with the second transmission structure 1-2*b*; the second operating shaft assembly 1-1*b* rotates around its axis to drive the second transmission structure 1-2*b* to reciprocate; the energy storage structure 1-3*b* includes an energy storage shaft 1-30*b* and a second energy storage spring structure 1-31*b*; one end of the second energy storage spring structure 1-31*b* is in driving connection to the energy storage shaft 1-30*b*, while the other end of the second energy storage spring structure 1-31*b* is arranged rotatably; the second transmission structure 1-2*b* is in driving fit with the energy storage shaft 1-30*b* to drive the energy storage shaft to rotate, so that the second energy storage spring structure 1-31*b* stores energy; the second energy storage spring structure 1-31*b* releases energy after turning past a second dead center position, so as to drive the energy storage shaft 1-30*b* to rotate; the energy storage shaft 1-30*b* includes an energy storage shaft gear 1-301*b*; the power output structure 1-4*b* includes a power output gear shaft 1-41*b*; and the energy storage shaft gear 1-301*b* is engaged with the power output gear shaft 1-41*b* to drive the power output gear shaft 1-41*b* to rotate. Specifically, the power output gear shaft 1-41*b* is in driving connection to the moving contact mechanism 2-1 of the conductive device 2. Of course, the conductive device 2 may be directly or indirectly connected to the moving contact mechanism 2-1.

The energy storage shaft of the operating mechanism drives the power output gear shaft to rotate through the cooperation of the energy storage shaft gear and the power output gear shaft, so that the breaking efficiency can be improved by setting a reasonable radius ratio between the energy storage shaft gear and the power output gear shaft, and an opening distance of the contact system connected to the operating mechanism can be increased.

Figure 1:
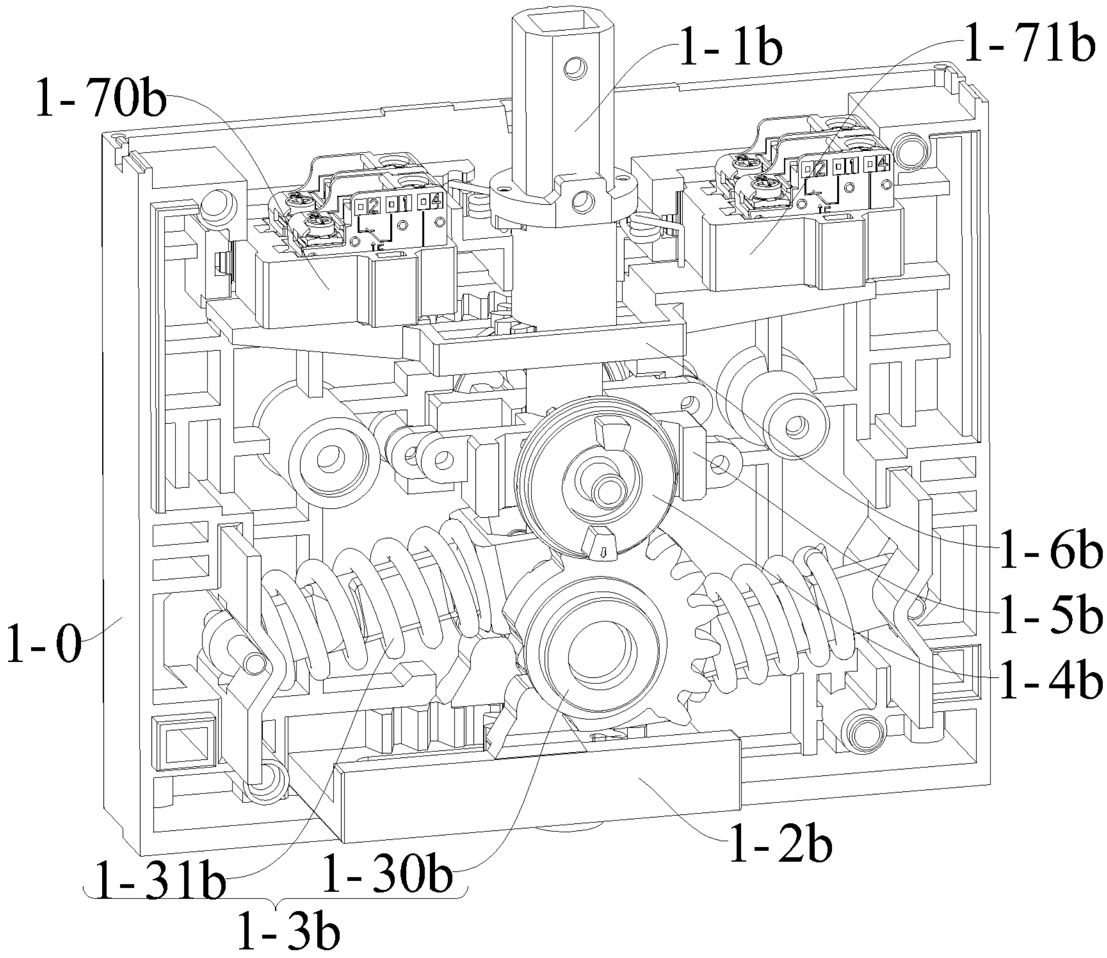
FIG. 1 is a schematic structural diagram of an operating mechanism of the present invention.

Preferably, as shown in FIG. 1, a gear radius of the energy storage shaft gear 1-301*b* is greater than a gear radius of the power output gear shaft 1-41*b*, which is conducive to increasing a rotation speed and angle of the power output gear shaft 1-41*b*, thereby increasing the breaking speed and opening distance of the conductive device 2 connected to the power output gear shaft 1-41*b*.

Figure 2:
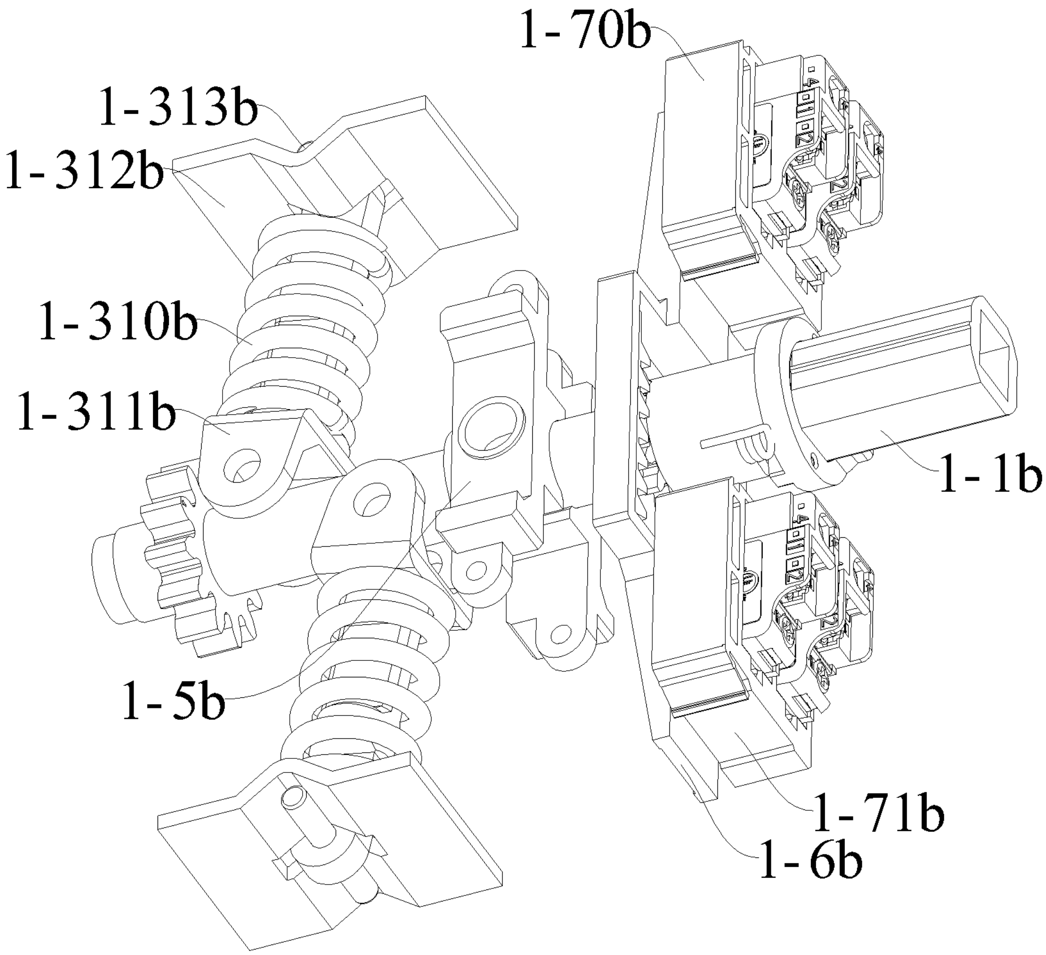
FIG. 2 is a schematic structural diagram of the operating mechanism of the present invention, in which at least an operating mechanism housing, a second transmission structure, an energy storage shaft and a power output gear shaft are omitted in comparison to FIG. 8.

As shown in FIGS. 1 to 2, the second transmission structure 1-2*b* includes a second transmission rack 1-22*b*; the second operating shaft assembly 1-1*b* includes a second operating shaft 1-10*b*, and a second drive gear 1-13*b* which is disposed on the second operating shaft 1-10*b* and rotates synchronously with the second operating shaft; and the second drive gear 1-13*b* is engaged with the second transmission rack 1-22*b*. The second operating shaft assembly 1-1*b* and the second transmission structure 1-2*b* are transmitted in a gear and rack fit manner, which is conducive to improving the transmission efficiency and reliability.

Figure 4:
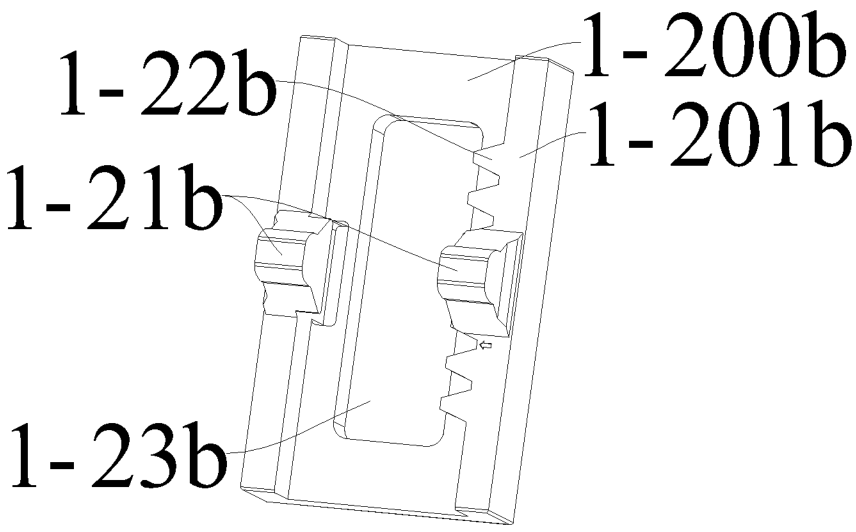
FIG. 4 is a schematic structural diagram of a second transmission structure of the present invention.
Figure 5:
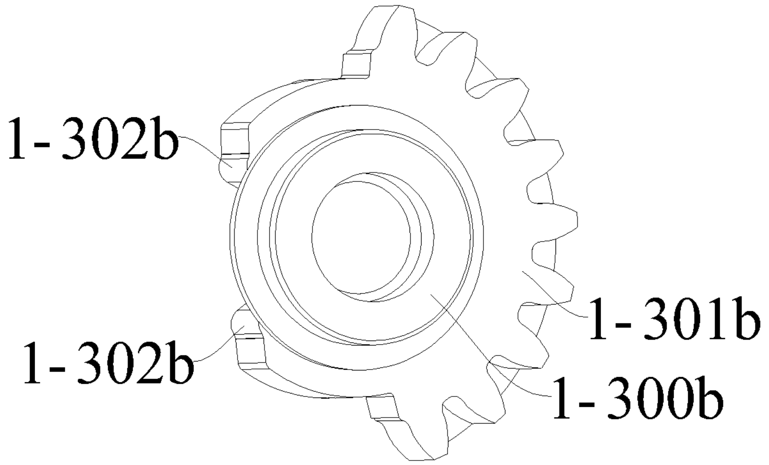
FIG. 5 is a schematic structural diagram of an energy storage shaft of the present invention, in which at least an energy storage shaft gear is shown.

As shown in FIGS. 1, and 4 to 5, the second transmission structure 1-2*b* further includes a second transmission structure driving portion 1-21*b*. The second transmission structure driving portion 1-21*b* is a second driving finger which extends and protrudes to the energy storage shaft 1-30*b*. The energy storage shaft 1-30*b* further includes a second driven structure, the second driven structure including two energy storage shaft force-loading sides 1-302*b* spaced from each other. The second transmission structure driving portion 1-21*b* is located between the two energy storage shaft force-loading sides 1-302*b*, and cooperates with the two energy storage shaft force-loading sides 1-302*b* respectively to drive the energy storage shaft 1-30*b* to rotate in two opposite directions.

Figure 6:
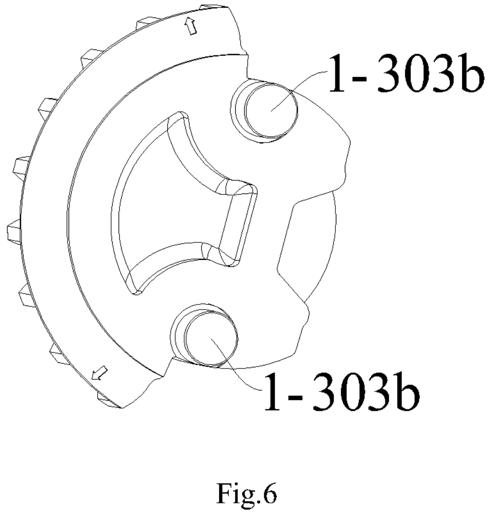
FIG. 6 is a schematic structural diagram of the energy storage shaft of the present invention, in which at least an energy storage shaft connecting column is shown.
Figure 7:
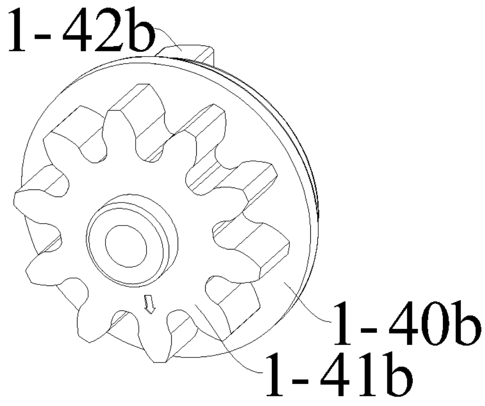
FIG. 7 is a schematic structural diagram of a power output gear shaft of the present invention.

As shown in FIG. 6, the energy storage shaft 1-30*b* further includes an energy storage shaft connecting column 1-303*b* disposed on an axial end of the energy storage shaft 1-30*b*. As shown in FIGS. 1 to 2, the second energy storage spring structure 1-31B includes a second energy storage spring 1-310*b*, a spring supporting rod 1-311*b*, a spring supporting seat 1-312*b* and a limiting shaft 1-313*b*; the spring supporting seat 1-312*b* is fixedly disposed on the operating mechanism housing 1-0) of the operating mechanism; one end of the spring supporting rod 1-311*b* is rotatably connected to the energy storage shaft connecting column 1-303*b*, while the other end of the spring supporting rod 1-311*b* passes through the spring supporting seat 1-312*b* and is then connected to the limiting shaft 1-313*b*; the limiting shaft 1-313*b* is in limiting fit with the spring supporting seat 1-312B to prevent the spring supporting rod 1-311*b* from detaching from the spring supporting seat 1-312*b*; the second energy storage spring 1-310*b* is disposed to sleeve the spring supporting rod 1-311*b*, and two ends of the second energy storage spring 1-310*b* are in elastic contact with the spring supporting rod 1-311*b* and the spring supporting seat 1-312*b*, respectively; and the energy storage shaft 1-30*b* rotates and drives the spring supporting rod 1-311*b* to move relative to the spring supporting seat 1-312*b* through the energy storage shaft connecting column 1-303*b*, so that the second energy storage spring 1-310*b* is compressed for energy storage.

As another embodiment, a telescopic rod may also be adopted as the spring supporting rod 1-311*b*, while the spring supporting seat 1-312*b* and the limiting shaft 1-313*b* are canceled. The second energy storage spring 1-310*b* is disposed to sleeve the telescopic rod, one end of the telescopic rod is rotatably connected to the energy storage shaft connecting column 1-310*b*, and the other end of the telescopic rod is rotatably disposed on the operating mechanism housing 1-0) of the operating mechanism 1. When the second energy storage spring 1-310 is compressed or released, the telescopic rod is shortened or elongated.

Preferably, as shown in FIG. 6, the energy storage shaft 1-30*b* includes two energy storage shaft connecting columns 1-303*b* which are spaced in parallel on its axial end, and two sets of second energy storage spring structures 1-31*b* are respectively disposed on two radial sides of the energy storage shaft 1-30*b* and cooperate with the two energy storage shaft connecting columns 1-303*b*, respectively.

As shown in FIGS. 1 to 2, the operating mechanism 1 includes two symmetrical energy storage shafts 1-30*b*, and two symmetrical power output gear shafts 1-41*b*; and the energy storage shaft gears 1-301*b* of the two energy storage shafts 1-30*b* are engaged with the two power output gear shafts 1-41*b*, respectively. Further, as shown in FIGS. 1 to 2, one end of the spring supporting rod 1-311*b* of the second energy storage spring structure 1-31*b* in each set is located between the two energy storage shafts 1-30*b*, and is rotatably connected to the corresponding two energy storage shaft connecting columns 1-303*b* of the two energy storage shafts 1-30*b*, respectively.

As shown in FIGS. 1 to 2, each power output structure 1-4*b* further includes an output structure bracket 1-5*b* which is disposed in the operating mechanism housing 1-0) and fixedly connected to the operating mechanism housing 1-0); and two power output gear shafts 1-41*b* are rotatably disposed on both sides of the output structure bracket 1-5*b* respectively, and each power output gear shaft 1-41*b* is located between the output structure bracket 1-5*b* and the operating mechanism housing 1-0). Further, as shown in FIGS. 1 to 2, the output structure bracket 1-5*b* includes an operating shaft mounting hole formed in the middle, and the second operating shaft 1-10*b* is rotatably inserted in the operating shaft mounting hole; a groove for accommodating the power output gear shaft 1-41*b* is respectively formed in both sides of the output structure bracket 1-5*b*; and the bottom wall of the groove is provided with a shaft hole in which the power output gear shaft 1-41*b* is rotatably disposed.

Preferably, as shown in FIGS. 1 to 2, the output structural bracket 1-5*b* includes two single-sided structural brackets that are opposed to cooperate with each other; and the two single-sided structural brackets are fixedly connected to a pair of opposite sidewalls of the operating mechanism housing 1-0), respectively. A groove for accommodating the power output gear shaft 1-41*b* is respectively formed in one side, facing the operating mechanism housing 1-0), of the each single-sided structural bracket, and the bottom wall of the groove is provided with a shaft hole in which the power output gear shaft 1-41*b* is rotatably disposed. A positioning boss is disposed on one side, facing the second operating shaft 1-10*b*, of the single-sided structural bracket; the positioning boss is provided with semi-shaft grooves; and the two shaft-axis grooves are spliced oppositely to form the operating shaft mounting hole for the second operating shaft 1-10*b* to be rotatably inserted. Further, as shown in FIGS. 1 to 2, a connecting lug which is fixedly connected to the operating mechanism housing 1-0) is disposed on both ends of each single-sided structural bracket, respectively.

Figure 3:
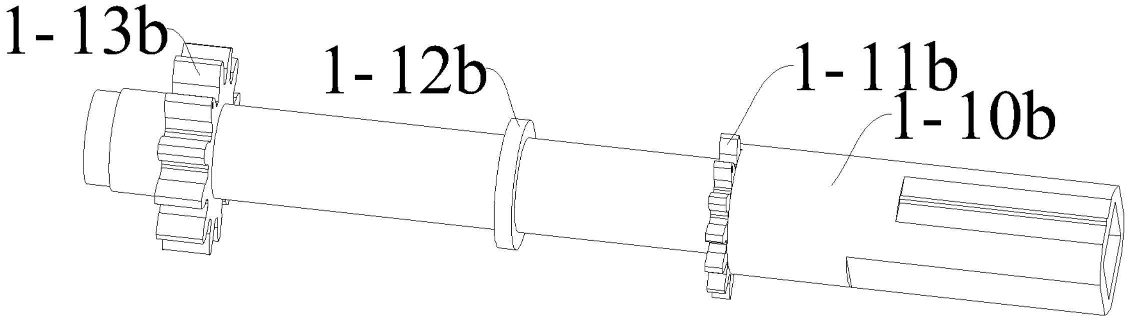
FIG. 3 is a schematic structural diagram of a second operating shaft of the present invention.

Preferably, as shown in FIG. 3, an annular limiting boss 1-12*b* is also disposed on the circumferential side of the second operating shaft 1-10*b*, and the annular limiting boss 1-12*b* is in limiting fit with the output structure bracket 1-5*b* to prevent the second operating shaft 1-10*b* from being away from the second transmission structure 1-2*b*.

As shown in FIGS. 1 to 2, the spring supporting rod 1-311*b* is set as the following structure to be in driving fit with the two symmetrical energy storage shafts 1-30*b*; the spring supporting rod 1-311*b* includes a supporting rod connecting portion and a supporting rod bearing portion; the supporting rod connecting portion is of a U-shaped structure, and includes a pair of supporting rod connecting side plates which are rotatably connected to the two energy storage shaft connecting columns 1-303 of the two energy storage shafts 1-30*b*, respectively; a bottom plate, which has a U-shaped structure, of the support rod connecting portion is connected to one end of the supporting rod bearing portion, and the other end of the supporting rod bearing portion is connected to the limiting shaft 1-313*b*; and the second energy storage spring is disposed to sleeve the supporting rod bearing portion, and two ends of the second energy storage spring are in elastic contact with the spring supporting seat 1-312*b* and the supporting rod connecting portion, respectively.

As shown in FIG. 4, the second transmission structure 1-2*b* includes two second transmission structure driving portions 1-21*b*, which are spaced in parallel and are in driving fit with the two symmetrical energy storage shafts 1-30*b*, respectively. Specifically, an embodiment of the second transmission structure 1-2*b* is shown in FIG. 4; the second transmission structure 1-2*b* includes a second transmission structure bottom plate 1-200*b* and two second transmission structure side plates 1-201*b*, wherein the two transmission structure side plates 1-201*b* are bendably connected to the second transmission structure bottom plate 1-200*b* to form a U-shaped structure as a whole; a second transmission structure driving portion 1-21*b* is disposed on a side of the second transmission structure side plate 1-201*b* away from the second transmission structure bottom plate 1-200*b*; the two second transmission structure driving portions 1-21*b* are disposed symmetrically, and are in driving fit with the second driven structures of the two energy storage shafts 1-30*b*, respectively; a second transmission rack 1-22*b* is disposed on an inner side wall (i.e., a side wall of this second transmission structure side plate 1-201*b* opposite the other second transmission structure side plate 1-201*b*) of one of the second transmission structure side plates 1-201*b*; and a second transmission structure avoidance hole 1-23*b* for the second operating shaft 1-10*b* to pass through is formed in the middle of the second transmission structure bottom plate 1-200*b*.

As another embodiment of the second transmission structure 1-2*b*; the second transmission structure 1-2*b* may not be provided with a second transmission structure side plate 1-20*b*, but the two second transmission structure driving portions 1-21*b* are spaced on the second transmission structure bottom plate 1-200*b* in parallel and are located on both sides of the second transmission structure avoidance hole 1-23*b*, and a second transmission rack 1-22*b* is disposed on an inner side wall of the second transmission structure avoidance hole 1-23*b*.

An embodiment of the energy storage shaft 1-30*b* is shown in FIGS. 5 to 6; each energy storage shaft 1-30*b* includes an energy storage shaft body 1-300*b*, an energy storage shaft gear 1-301*b*, a second driven structure and energy storage shaft connecting columns 1-303*b*; the second driven structure and the energy storage shaft gear 1-301*b* are located at two radial ends of the energy storage shaft body 1-300*b*, respectively; the second driven structure includes two symmetrical energy storage shaft force-loading sides 1-302*b*; the two energy storage shaft connecting columns 1-303*b* are spaced at the axial end of the energy storage shaft body 1-300*b* in parallel, and are symmetrically distributed on both sides of an axis of the energy storage shaft 1-30*b*; and an extension direction of the energy storage shaft connecting columns 1-303*b* is parallel to an axial direction of the energy storage shaft 1-30*b*. Further, each energy storage shaft force-loading side 1-302*b* is an arc-shaped surface.

As shown in FIGS. 1 to 2, the operating mechanism 1 further includes an auxiliary switch and an auxiliary switch driving structure 1-6*b*; the second operating shaft assembly 1-1*b* further includes an auxiliary drive gear 1-11*b* which is disposed on the second operating shaft 1-10*b* and rotates synchronously therewith; the auxiliary switch driving structure 1-6*b* includes an auxiliary driven rack 1-61*b*, and the auxiliary drive gear 1-11*b* is engaged with the auxiliary driven rack 1-61*b*; and the second operating shaft 1-10*b* rotates to drive the auxiliary switch driving structure 1-6*b* to move through the cooperation of the auxiliary drive gear 1-11*b* and the auxiliary driven rack 1-61*b*, so as to trigger the auxiliary switch. Further, as shown in FIGS. 1 to 2, the operating mechanism 1 in the second embodiment includes two auxiliary switches, i.e., a first auxiliary switch 1-70*b* and a second auxiliary switch 1-71*b* which are disposed on both sides of the first operating shaft 1-10 respectively. The auxiliary switch driving structure 1-6*b* further includes a driving structure body 1-60*b*, a first trigger arm 1-62*b* and a second trigger arm 1-63*b*. The first trigger arm 1-62*b* and the second trigger arm 1-63*b* are connected to both ends of the driving structure body 1-60*b* respectively and are in driving fit with the first auxiliary switch 1-70*b* and the second auxiliary switch 1-71*b*, respectively. The auxiliary driven rack 1-61*b* is disposed on the driving structure body 1-60*b*.

Figure 8:
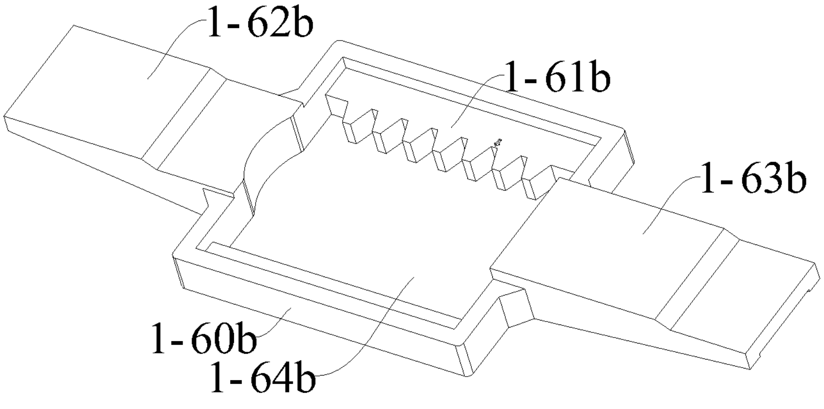
FIG. 8 is a schematic structural diagram of an auxiliary switching driving structure of the present invention.

An embodiment of the auxiliary switch driving structure 1-6*b* is shown in FIG. 8; the auxiliary switch driving structure 1-6*b* includes a driving structure body 1-60*b*, an auxiliary driven rack 1-61*b*, a first trigger arm 1-62*b* and a second trigger arm 1-63*b*, wherein the driving structure body 1-60*b* is of a square frame structure, and a driving structure avoidance hole 1-64*b* for the second operating shaft 1-10*b* to pass through is formed in the middle of the driving structure body 1-60*b*; the auxiliary driven rack 1-61*b* is disposed on an inner side wall of the driving structure avoidance hole 1-64*b*; and the first trigger arm 1-62*b* and the second trigger arm 1-63*b* are connected to both ends of the driving structure body 1-60*b* respectively, and extend to the first auxiliary switch 1-70*b* and the second auxiliary switch 1-71*b*, respectively.

Preferably, as shown in FIG. 8, the first trigger arm 1-62*b* includes a first trigger side and a first release side which are sequentially disposed along its extension direction, wherein the first release side is disposed closely to the driving structure body 1-60*b*, and the first trigger side is higher than the first release side in a direction toward the first auxiliary switch 1-70*b*. The second trigger arm 1-63*b* includes a second trigger side and a second release side which are sequentially disposed along its extension direction, wherein the second trigger side is disposed closely to the driving structure body 1-60*b*, and the second trigger side is higher than the second release side in a direction toward the second auxiliary switch 1-71*b*.

Preferably, the first auxiliary switch 1-70*b* and the second auxiliary switch 1-71*b* are triggered at the same time. Further, as shown in FIGS. 1 to 2, the auxiliary switch is a micro switch, the micro switch including a driving rod. The driving rods of the two micro switches are simultaneously pressed or released by the auxiliary switch driving structure 1-6*b*.

Combined with FIG. 1, an action process of the operating mechanism 1 will be described below:

one end of the second operating shaft 1-10*b* protrudes out of the operating mechanism housing 1-0) for people to operate; the second operating shaft 1-10*b* is driven by an external force to rotate, driving the second drive gear 1-13*b* to rotate synchronously; the second operating shaft 1-10*b* drives the second transmission structure 1-2*b* to slide on the operating mechanism housing 1-0) through the cooperation of the second drive gear 1-13*b* and the second transmission rack 1-22*b*; the second transmission structure 1-2*b* pushes the energy storage shaft force-loading side 1-302*b* of the energy storage shaft 1-30*b* through the second transmission structure driving portion 1-21*b*, such that the energy storage shaft 1-30*b* rotates; the energy storage shaft 1-30*b* drives the second energy storage spring structure 1-31*b* to rotate, such that the second energy storage spring is compressed for energy storage; when the second energy storage spring structure 1-31*b* rotates to a second dead center position, an axis of the second energy storage structure 1-31*b* coincides with an axis of the energy storage shaft 1-30*b*; after the energy storage shaft 1-30*b* drives the second energy storage spring structure 1-31*b* to rotate through the second dead center position, the second energy storage spring structure 1-31*b* drives the energy storage shaft 1-30*b* to rotate rapidly; and the energy storage shaft 1-30*b* drives the power output gear shaft 1-41*b* to rotate rapidly, such that the power output gear shaft outputs a driving force outward to drive the moving contact mechanism 2-1 of the conductive device 2 to rotate, and then the conductive device 2 is switched on or off.

A layout mode of the operating mechanism 1 is shown in FIG. 1:

the second operating shaft 1-10*b* of the second operating shaft assembly 1-1*b* is disposed along a length direction of the operating mechanism 1; one end of the second operating shaft 1-10*b* protrudes out of one end of the operating mechanism in the length direction for external operation; the second transmission structure 1-2*b* is slidably disposed at the other end of the operating mechanism in the length direction; the first auxiliary switch 1-70*b* and the second auxiliary switch 1-71*b* are spaced side by side along a width direction of the operating mechanism; the auxiliary switch driving structure 1-6*b*, the power output structure 1-4*b* and the second energy storage spring structure are arranged sequentially along the length direction of the operating mechanism and are located between the auxiliary switch (i.e., the first auxiliary switch 1-70*b* and the second auxiliary switch 1-71*b*) and the second transmission structure 1-2*b*; the two power output gear shafts 1-41*b* are spaced side by side on both sides of the second operating shaft 1-10*b* along a thickness direction of the operating mechanism 1; the two energy storage shafts 1-30*b* are arranged side by side on both sides of the second operating shaft 1-10*b* along the thickness direction of the operating mechanism 1; an output structure bracket 1-5*b* of the power output structure 1-4*b* is disposed between two power output gear shafts 1-41*b*; the two power output gear shafts 1-41*b* are rotatably disposed on the output structure bracket 1-5*b*, respectively; and the second operating shaft 1-10*b* passes through the middle of the output structure bracket 1-5*b*. Specifically, referring to the directions shown in FIG. 1, a vertical direction in FIG. 1 is a length direction of the operating mechanism 1, a transverse direction in FIG. 1 is a width direction of the operating mechanism 1, and an inside-to-outside direction in FIG. 1 is a thickness direction of the operating mechanism 1.

As shown in FIG. 1, an axial direction of the second operating shaft 1-10*b* is perpendicular to an axial direction of the power output gear shaft 1-41*b*, perpendicular to an axial direction of the energy storage shaft 1-30*b*, perpendicular to a movement direction of the second transmission structure 1-2*b* and a plane where it is located, and perpendicular to a movement direction of the auxiliary switch driving structure 1-6*b*; and an axial direction of the power output gear shaft 1-41*b* is parallel to the axial direction of the energy storage shaft 1-30*b*, and the power output gear shaft 1-41*b* and the energy storage shaft 1-30*b* are coplanar and are both parallel to the movement direction of the second transmission structure 1-2*b* and a plane where it is located, and parallel to a plane where the auxiliary switch driving structure 1-6*b* is located.

As shown in FIG. 9, in the switching device of the present invention, the operating mechanism 1 is in driving connection to the conductive device 2 through a first connecting structure, and the conductive devices 2 are in driving connection by a second connecting structure. The first connecting structure includes a power output shaft of the operating mechanism 1 and a contact support 2-10 of the conductive device 2, and a first empty stroke is provided between the power output shaft and the contact support, so that the power output shaft turns a preset angle and then cooperates with the contact support and drives the contact support to rotate. The second connecting structure includes contact supports and shaft connectors 4 of two adjacent conductive devices 2, and two axial ends of each shaft connector 4 are respectively in limiting fit with the two contact supports and rotate synchronously therewith. Further, the power output shaft of the operating mechanism is a power output gear shaft 1-41*b* of the operating mechanism 1. Of course, operating mechanisms of other structures may also be adopted.

Specifically; when the power output gear shaft 1-41*b* of the operating mechanism 1 passes through the first empty stroke relative to the contact support, the second energy storage spring completes energy storage. When the power output gear shaft 1-41*b* continues to rotate, that is, after the second energy storage spring 1-31*b* passes through the second dead center position, the second energy storage spring begins to release energy through the power output gear shaft 1-41*b* to drive the contact support to rotate rapidly, such that the conductive device 2 is switched on or off rapidly.

The above content is a further detailed description of the present invention in conjunction with specific preferred embodiments, but it cannot be regarded that the specific embodiments of the present invention are limited to these descriptions. For a person of ordinary skill in the art to which the present invention belongs, without departing from the idea of the present invention, a number of simple deductions or replacements may be made, which should be regarded as falling within the protection scope of the present invention.

The invention claimed is:

1. An operating mechanism, comprising an operating mechanism housing, and a second operating shaft assembly, a second transmission structure, an energy storage structure and a power output structure which are respectively disposed in the operating mechanism housing, wherein the second operating shaft assembly is in driving fit with the second transmission structure; the second operating shaft assembly rotates around an axis of the second operating shaft assembly to drive the second transmission structure to reciprocate; the energy storage structure comprises an energy storage shaft and a second energy storage spring structure; one end of the second energy storage spring structure is in driving connection to the energy storage shaft while the other end of the second energy storage spring structure is arranged rotatably; the second transmission structure is in driving fit with the energy storage shaft to drive the energy storage shaft to rotate, so that the second energy storage spring structure stores energy; the second energy storage spring structure releases energy after turning past a second dead center position to drive the energy storage shaft to rotate; the energy storage shaft comprises an energy storage shaft gear; the power output structure comprises a power output gear shaft; and the energy storage shaft gear is engaged with the power output gear shaft to drive the power output gear shaft to rotate;

the operating mechanism further comprises an auxiliary switch and an auxiliary switch driving structure which are disposed in the operating mechanism housing, respectively; the second operating shaft assembly further comprises an auxiliary drive gear which is disposed on a second operating shaft of the second operating shaft assembly and rotates synchronously therewith; the auxiliary switch driving structure comprises an auxiliary driven rack, and the auxiliary drive gear is engaged with the auxiliary driven rack; and the second operating shaft rotates to drive the auxiliary switch driving structure to move through a cooperation of the auxiliary drive gear and the auxiliary driven rack, so as to trigger the auxiliary switch.

2. The operating mechanism according to claim 1, wherein a gear radius of the energy storage shaft gear is greater than a gear radius of the power output gear shaft.

3. The operating mechanism according to claim 1, wherein the second transmission structure comprises a second transmission rack; the second operating shaft assembly comprises a second operating shaft, and a second drive gear which is disposed on the second operating shaft and rotates synchronously with the second operating shaft; and the second drive gear is engaged with the second transmission rack; and the second transmission structure further comprises a second transmission structure driving portion; the second transmission structure driving portion is a second driving finger which extends and protrudes to the energy storage shaft; the energy storage shaft further comprises a second driven structure, the second driven structure comprising two energy storage shaft force-loading sides spaced from each other; and the second transmission structure driving portion is located between the two energy storage shaft force-loading sides, and cooperates with the two energy storage shaft force-loading sides respectively to drive the energy storage shaft to rotate in two opposite directions.

4. The operating mechanism according to claim 1, wherein the energy storage shaft further comprises an energy storage shaft connecting column disposed on an axial end of the energy storage shaft; the second energy storage spring structure comprises a second energy storage spring, a spring supporting rod, a spring supporting seat and a limiting shaft; the spring supporting seat is fixedly disposed on the operating mechanism housing; one end of the spring supporting rod is rotatably connected to the energy storage shaft connecting column, while the other end of the spring supporting rod passes through the spring supporting seat and is then connected to the limiting shaft; the limiting shaft is in limiting fit with the spring supporting seat to prevent the spring supporting rod from detaching from the spring supporting seat; the second energy storage spring is disposed to sleeve the spring supporting rod, and two ends of the second energy storage spring are in elastic contact with the spring supporting rod and the spring supporting seat, respectively; the energy storage shaft rotates and drives the spring supporting rod to move relative to the spring supporting seat through the energy storage shaft connecting column, so that the second energy storage spring is compressed for energy storage;

the energy storage shaft comprises two energy storage shaft connecting columns which are spaced form each other in parallel, and two sets of second energy storage spring structures are respectively disposed on two radial sides of the energy storage shaft and cooperate with the two energy storage shaft connecting columns, respectively; and the operating mechanism comprises two symmetrical energy storage shafts, and the spring supporting rods of the second energy storage spring structures are located between the two energy storage shafts and rotatably connected to the corresponding the two energy storage shaft connecting columns of the two energy storage shafts.

5. The operating mechanism according to claim 1, wherein the energy storage shaft further comprises an energy storage shaft body; the energy storage shaft gear is a sector gear and is located at one radial end of the energy storage shaft body; two energy storage shaft force-loading sides are located at the other radial end of the energy storage shaft body; and two energy storage shaft connecting columns are spaced on an axial end of the energy storage shaft body in parallel.

6. The operating mechanism according to claim 1, wherein the operating mechanism comprises two symmetrical energy storage shafts, and two symmetrical power output gear shafts; and the energy storage shaft gears of the two energy storage shafts are engaged with the two power output gear shafts, respectively.

7. The operating mechanism according to claim 6, wherein the power output structure further comprises an output structure bracket which is disposed in the operating mechanism housing and fixedly connected to the operating mechanism housing; and two power output gear shafts are rotatably disposed on both sides of the output structure bracket respectively, and each power output gear shaft is located between the output structure bracket and the operating mechanism housing.

8. The operating mechanism according to claim 7, wherein the output structure bracket comprises an operating shaft mounting hole formed in a middle of the output structure bracket, and a second operating shaft of the second operating shaft assembly is rotatably inserted in the operating shaft mounting hole.

9. The operating mechanism according to claim 8, wherein the output structure bracket comprises two single-sided structural brackets that are opposed to cooperate with each other; and the two single-sided structural brackets are fixedly connected to a pair of opposite sidewalls of the operating mechanism housing, respectively.

10. The operating mechanism according to claim 1, wherein the operating mechanism comprises two auxiliary switches, i.e., a first auxiliary switch and a second auxiliary switch which are disposed on both sides of the first operating shaft respectively; the auxiliary switch driving structure further comprises a driving structure body, a first trigger arm and a second trigger arm; the first trigger arm and the second trigger arm are connected to both ends of the driving structure body and are in driving fit with the first auxiliary switch and the second auxiliary switch, respectively; and the auxiliary driven rack is disposed on the driving structure body.

11. The operating mechanism according to claim 10, wherein the driving structure body is of a square frame structure, and a driving structure avoidance hole for the second operating shaft to pass through is formed in a middle of the driving structure body; the auxiliary driven rack is disposed on one inner side wall of the driving structure avoidance hole; and the auxiliary drive gear is located in the driving structure avoidance hole.

12. The operating mechanism according to claim 1, wherein the second operating shaft of the second operating shaft assembly is disposed along a length direction of the operating mechanism; one end of the second operating shaft protrudes out of one end of the operating mechanism in the length direction for external operation; the second transmission structure is slidably disposed at the other end of the operating mechanism in the length direction; a first auxiliary switch and a second auxiliary switch are spaced side by side along a width direction of the operating mechanism; the auxiliary switch driving structure, the power output structure and the second energy storage spring structure are arranged sequentially along the length direction of the operating mechanism and are located between the auxiliary switch and the second transmission structure; the two power output gear shafts are spaced side by side on both sides of the second operating shaft along a thickness direction of the operating mechanism; the two energy storage shafts are spaced side by side on both sides of the second operating shaft along the thickness direction of the operating mechanism; an output structure bracket of the power output structure is disposed between two power output gear shafts; the two power output gear shafts are rotatably disposed on the output structure bracket, respectively; and the second operating shaft passes through a middle of the output structure bracket.

13. A switching device, comprising the operating mechanism according to claim 1.

14. The switching device according to claim 13, wherein the switching device further comprises a conductive device which is in driving connection to the operating mechanism; the conductive device comprises a conductive device housing, and a contact system and an arc extinguishing system which are disposed in the conductive device housing and used in cooperation therewith; the contact system comprises a moving contact mechanism pivotally disposed on the conductive device housing, and a static contact cooperating with the moving contact mechanism; the operating mechanism is in driving connection to the moving contact mechanism and thus drives the moving contact mechanism to rotate, so that the moving contact mechanism and the static contact are closed or opened; and the moving contact mechanism comprises a contact support which is disposed pivotally, and a moving contact assembly inserted in the contact support, wherein both ends of the contact support protrude out of two radial ends of the contact support; two static contacts are disposed on both sides of the moving contact mechanism to cooperate with both ends of the moving contact assembly; and the arc extinguishing system comprises two arc extinguishing chambers which are disposed on both sides of the contact system respectively.

* * * * *